April 8, 1941.  H. McCORNACK  2,237,444
PULSATOR
Filed April 23, 1937  2 Sheets-Sheet 1

Inventor.
Herbert McCornack.

April 8, 1941.  H. McCORNACK  2,237,444
PULSATOR
Filed April 23, 1937   2 Sheets-Sheet 2

Inventor:
Herbert McCornack.

Patented Apr. 8, 1941

2,237,444

UNITED STATES PATENT OFFICE

2,237,444

PULSATOR

Herbert McCornack, Howey-in-the-Hills, Fla., assignor to McCornack Inventions, Inc., Howey, Fla., a corporation of Florida Application April 23, 1937, Serial No. 138,820

6 Claims. (Cl. 31—70)

This invention relates to pulsators actuated by inequalities in fluid pressure for producing a pulsating, intermittent or reciprocating action and particularly to mechanism of this character adapted for use in cow milking machinery. This pulsator may also be applied to other purposes where suction and atmospheric pressure are used and is in the nature of an improvement of my pulsators, U. S. Patent No. 1,392,346, dated October 4, 1921, and No. 1,829,907, dated November 3, 1931.

It is one of the objects of this invention to provide a pulsator of more convenient operation, simpler construction and less production cost.

Another object is more prompt, reliable and effective action.

A further object is a more sanitary pulsator for milking machines.

Referring now to the drawings, which illustrate a preferred embodiment of the invention:

Figure 1:
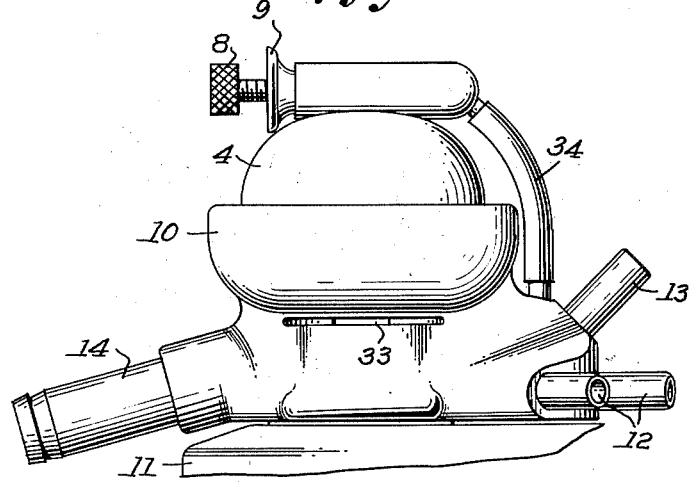
Figure 1 is a side elevation of the pulsator mounted upon the lid of a milk container.
Figure 2:
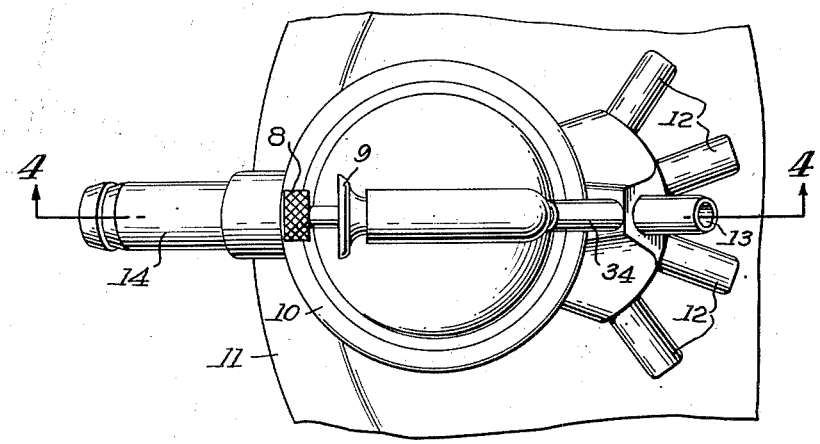
Figure 2 is a plan view of the pulsator upon the lid of a milk container.
Figure 3:
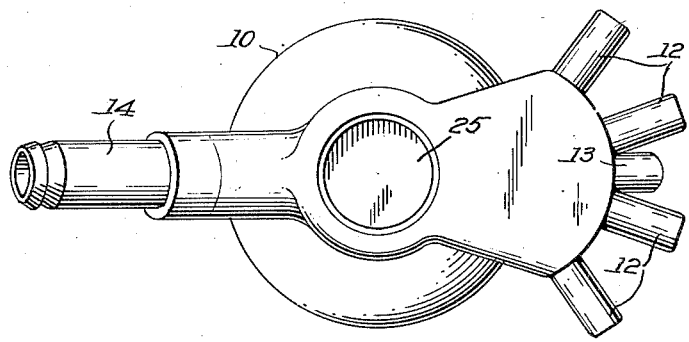
Figure 3 is a bottom plan view of the pulsator.

The objects of this invention are accomplished by the following means:

By the use of a one-piece, flexible diaphragm which actuates the pulsator valve, while at the same time, it acts as sealing means for the pulsator body. This flexible diaphragm also serves to hold the pulsator in operative assemblage by means of atmospheric pressure and thus avoids the use of screws and threaded members.

By the use of extremely light-weight, drawn pulsator members, namely, (a) the poppet valve member, (b) the upper valve seat member, (c) the pressure plate disc member, and (d) the pulsator cover, and (e) by the use of the light-weight valve pressing member through which the alternating suction and pressure of the atmosphere upon the diaphragm actuates the poppet valve by means of a contact which provides for freedom of rotary and oscillating movement of the valve.

By providing improved means of sealing the connection between the pulsator and the lid of the milk container. This provision consists of a circular recess in the post chamber of the pulsator body into which the sealing ring gasket is compressed.

By the improved check valve means for controlling the vacuum in the milk container. In former practice the check valve seats itself upon an extending member on the lid of the milk container. In my present device the vacuum control, between the pulsator and milk container, is accomplished by means of a valve incorporated and seated within the pulsator body.

In the operation of this type pulsator, it is of prime importance to provide a valve which is not handicapped in its action by inertia or restrictional resistance. The provision in this device of a single-piece valve member of weight so extremely light as to reduce the momentum of its action to the minimum and so related to its actuating members that it adjusts itself to its valve seat with practically no resistance, other than its own slight inertia, has made lubrication of this pulsator wholly unnecessary. This is very important, as the series effect of oil on the rubber parts of the milker and the habitual neglect of the operator to keep the unit lubricated are thus avoided.

In my former U. S. Patent No. 1,392,346 and No. 1,829,907, referred to above, the valves are handicapped by their own weight and by the weight of associated guiding and actuating members which move with them.

In my present device, a recess is provided in the post chamber of the pulsator body into which a ring gasket is compressed as sealing means between the pulsator and the lid of the milk container. This ring is always held securely in place in its seat when the pulsator is detached from the milk container lid, with the advantage that it leaves the lid in a more sanitary condition and the ring gasket better protected. In my previous devices, I have used elastic ring gaskets mounted on the post of the milk container lid. This provision has two disadvantages, first, that when disassembled, the ring gasket remains on the post of the milk container lid, and second, that the ring becomes extended with wear and falls off the post.

The provision, in my present device of incorporating the check valve, preferably a ball valve, with its seat in the pulsator body instead of being seated on the post of the milk container lid provides a much simpler, more sanitary and less costly vacuum control between the container and the vacuum source. The important function of this check valve is to prevent inflow of atmosphere to the milk container after the milking unit has been detached from the cow and until the operator has taken it to the place where it is to be emptied.

My improved pulsator, as herein described, has only three acting members, first, an essentially and extremely light-weight, disc-shaped, single-piece poppet valve, second, a flexible diaphragm which is actuated by variable atmospheric pressure, and, third, a valve pressure member through which pressure of the diaphragm is transmitted to the poppet valve. An essential relation of these three acting members is that they function free from restraint from each other. This is accomplished, first, by means of the freely sliding relation of the diaphragm with the valve-pressing member, more definitely explained later in the specification, and second, by contact between the pressure member and the poppet valve which provides freedom of rotary and oscillating movement of the valve; both of which are essential to the uniform wear and the correct seating of the valve.

Figure 4:
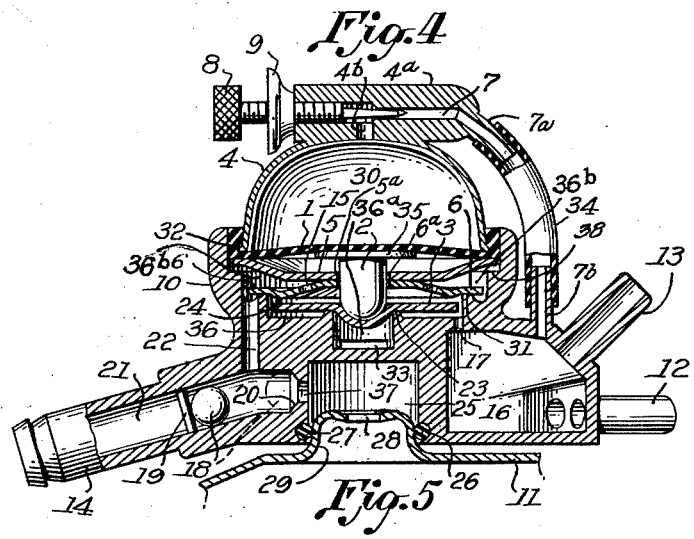
Figure 4 is a vertical sectional view of the pulsator on line 4—4 of Figure 2.
Figure 5:
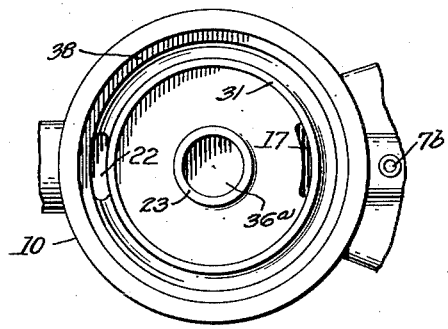
Figure 5 is a plan view of the pulsator body with working parts removed.
Figure 6:
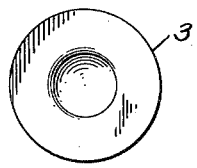
Figure 6 is a plan view of the poppet valve.
Figure 7:
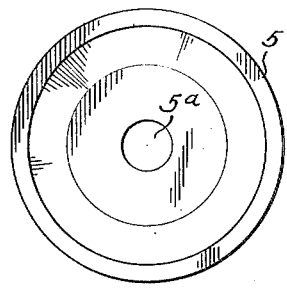
Figure 7 is a plan view of the pressure plate member.
Figure 8:
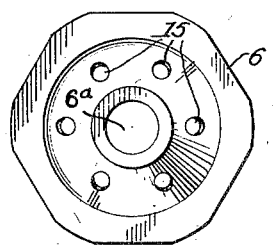
Figure 8 is a plan view of the upper valve seat member.

In the embodiment of this invention, the pulsator is shown as applied to lid 11 of the milk container, the lid being provided as shown in Figure 4 with an upstanding post 29 over which sits the walls of the chamber 25 of the pulsator body 10 which provides for the connection between the vacuum source and the milk container. A circular recess 26 is provided in the walls of the pulsator chamber 25 which retains an elastic gasket ring 27 to seal the passage 28 from chamber 25 to the milk container. Vacuum is supplied to this pulsator from pipe 21 to the milk container by way of passage 37 and chamber 25.

The check valve 18 is spherical in form and is located in passage 21. The air in the milk container is constantly exhausted through chamber 25, passage 37, pipe 21, nipple 14, and through a hose (not shown) connected to the nipple 14 and to a source of vacuum. The check valve 18 is held open during the milking operation by the vacuum and is returned to its seat 20 to prevent a loss of vacuum in the container when the vacuum hose is disconnected. To keep the check valve 18 in operative position and to keep it from falling out of the pulsator, a stop 19 is provided.

The pulsator proper comprises a pulsator body 10. The body 10 has a plurality of nipples 12 communicating with a pulsation chamber 16 in the body 10 and, by means of hoses (not shown) with the inflations of the teat-cups of a cow-milking machine. A single nipple 12 may also be connected alternatively to any other device adapted to be actuated by intermittent alternating vacuum and atmospheric pressure. The nipple 13, which also communicates with the pulsation chamber 16 of the body 10, is connected by means of a hose (not shown) with the oscillator device shown and described in my U. S. Patent No. 1,859,214, dated May 17, 1932.

The pulsator also comprises a pulsator body 10 having opening toward the upper surface thereof, a recess, which is normally covered by the cover plate and diaphragm pressed therein and which comprises a series of four successive step-like portions which are progressively smaller from the upper surface of the pulsator body. The lowermost and smallest portion of the recess constitutes chamber 36a and communicates with the atmosphere through one or more radial passages 33, only one of which is shown in Figure 4. The upper edge of the wall of the portion 36a is formed as a flat seat 23 for the valve plate 3. The uppermost portion of the recess and the portion immediately therebelow are formed to receive the drawn sheet-metal plates 5 and 6, which are centrally perforated to guide the slidable push button 2. The plate 6 rests on the flat seat 31 of the recess portion and, together with the bottom of the recess portion about seat 23, constitutes a valve chamber 36 for the valve-plate 3, which is of slightly less diameter than that of the chamber 36, so as to fit loosely therein. The plate 6 is formed with an edge inscribed in an imaginary circle, portions of the edge coinciding with the circle and other portions lying within the circle. The plate 6 is of such a size as to slip with slight play into the corresponding recess portion; and the edge parts which are not circular provide passages for air about the edges. The plate 6 has a plurality of perforations 15 to permit passage of air through the plate, and a circular drawn ridge near the circumference constituting the upper seat 24 for valve 3.

The plate 5 is of slightly less diameter than that of the uppermost recess portion, so as to fit loosely therein, and is drawn with a downwardly bulging central portion and a raised edge which after assembly is held above the flat seat 38 of the uppermost recess portion. The seat 38 prevents excessive tilting of the plate 5 during assembly. The diaphragm 1 is of rubber and has a circumferential thickened portion provided with an internal groove to receive the lip 32 of the cover 4. The diameter of the diaphragm is such that when it is attached to the cover 4 the two parts may be pressed snugly into the uppermost recess portion by the fingers. The space below the diaphragm 1 and above the plate 6 is designated as chamber 36b. The space between the cover 4 and the diaphragm is designated as the diaphragm chamber 30.

Push button 2 is provided with a flat enlargement 35 at the upper end to bear against the diaphragm 1 and a spherical surface at the lower end to bear against a corresponding spherical depression in the valve 3. The diaphragm 1 is so located that its tension continually urges the button 2 downwardly.

In assembling, the valve 3, the plate 6, the plate 5, the push button 2, and the assembled cover 4 and diaphragm 1 are inserted in the body 10 in the order named.

The pulsator cover 4 is of sheet-metal drawn to shape. Soldered or welded to the top thereof is a projection or boss 4a having a horizontal passage 7 therein controlled by the needle-valve 8 which is provided with the lock nut 9 to hold it in adjustment. The passage 7 communicates through the vertical passage 4b with the diaphragm chamber 30 in the cover 4 and with the nipple 7a projecting from the projection 4a. The hose 34 connects the nipples 7a and 7b, so that the pulsation chamber 16 and the diaphragm chamber 30 are in constant communication through throttle passage 7.

In the body 10, the chamber 36 is in communication with the pulsation chamber 16 through passage 17, and the chamber 36b is in communication with the suction passage 21 through passage 22.

Sub-atmospheric pressure of varying degree will at all times prevail in the chamber 36b, since the source of vacuum has access, whether the valve 3 is up or down, to the chamber 36b through the passages 21 and 22, through the space about the plate 6, the holes 15 of plate 6, and through the holes 5a and 6a of plates 5 and 6. When the valve 3 is up, the sub-atmospheric pressure is lower, since there is no access to the atmosphere through the passages 33 or to the air in the chamber 16 and communicating passages, which is at varying pressure below atmospheric.

Because of the difference between the diameter of the seats 23 and 24, if the pressure of the air in chamber 36a is just sufficient to overcome the forces holding the valve 3 against the seat 23, the valve 3 will be raised, and the rush of air under the valve 3 and the sudden increase of area exposed to atmospheric pressure will raise the valve 3 abruptly against the seat 24.

The plate, which is then struck by the valve 3, cannot rise appreciably, since the atmospheric pressure is relieved by the movement of air into the pulsation chamber 16 and communicating parts, in which sub-atmospheric pressure has just previously prevailed.

Some of the air admitted to the chamber 16 passes through the nipples 12 to fill the inflations of teat-cups or through the nipple 13 to actuate an oscillator as described above.

Air passes slowly through the nipple 7b, hose 34, nipple 7a, passage 7, past valve 8 and through passage 4b to the chamber 30, where the slow increase of air pressure causes the diaphragm 1 to press down on push button 2, and the valve 3. The air pressure against the lower face of valve 3 holds the valve against the seat 24, since sub-atmospheric pressure is always present in the chamber 36b. The slow flow of air through the passage 4b into the chamber 30 at length increases the air pressure in the chamber 30 sufficiently so that the air pressure against the diaphragm 1 overbalances the air pressure against the area of the valve 3 covering the seat 24, and the diaphragm 1, urged by the air pressure and by its own tension, forces the valve 3 abruptly from its upper seat 24 to the lower seat 23. The nature of the movement of air in the chamber 36 is such that flow of air radially over seat 23 cannot prevent the seating of the valve 3. After seating on seat 23, the reduction of the area of the valve 3 exposed to air pressure from below causes the valve to remain firmly seated. Sub-atmospheric pressure will now be produced in the chamber 30 because of air flow through the passage 4b, passage 7, nipple 7a, hose 34, nipple 7b, pulsation chamber 16, passage 17, valve chamber 36, holes 15 in the plate 6, the space about plate 6, and the passages 22, to the passage 21. The lessening of pressure in the chamber 30 will progress until the opposed atmospheric pressure of chamber 36a can raise the valve 3, when the cycle of motions and flow of air will be repeated, with corresponding increase and decrease of pressure in parts 12 and 13 and the parts thereto connected.

It is apparent that the atmospheric pressure acting on cover 4 and the edge of diaphragm 1 is sufficient to hold the parts 1, 2, 3, 5, and 6 in assembled relation, since the horizontal area of parts 1, 4 and 4a exposed to external atmospheric pressure is greater than the area of valve 3 and the plate 6 exposed to upward atmospheric pressure when the valve 3 is in its upward position, and since, as above pointed out, the pressure on the lower surface of the valve 3 and plate 6 cannot rise quite to atmospheric pressure.

It is also noted that the valve 3 should be light, in order to insure successful action.

I claim:

1. In a diaphragm, poppet valve pulsator, a body having a chamber with an opening, a cover for closing said opening, operating members within said chamber, and a flexible diaphragm, attached to said cover, which serves to seal the joint between said body and said cover, the assembly being so constructed that atmospheric pressure applied through said cover, aids in holding the said operating members within said chamber in working relation.

2. In a diaphragm pulsator having a chamber, a flexible diaphragm, a single poppet valve within said chamber, said valve having valve seats at its opposite sides, an actuating member extending from said diaphragm to said valve, guide means provided between said diaphragm and said valve, said guide means holding said actuating member in correct diametric position in said chamber and said actuating member, and said poppet valve forming a joint therebetween providing for the rotary movement and universal adjustment of said valve upon said valve seats.

3. In a diaphragm pulsator having a chamber, a single, floating poppet valve, within said chamber having seats on its opposite sides, said valve having a substantially semispherical depression for receiving a correspondingly shaped actuating member, and a diaphragm operating said valve and actuated by variations of air pressure, said actuating member holding said valve in correct diametric relation to its valve seats and providing said valve with universal freedom in rotary action and adjustment upon its seats.

4. In a diaphragm pulsator having a chamber, a flexible diaphragm having no air passage therein, a single poppet valve, within said chamber, having seating means on its opposite sides, and a single-piece actuating member between said diaphragm and said valve, said actuating member and valve providing engaging parts for holding said valve in central relation to said seats and for allowing said valve free universal and rotary movement.

5. A unit mechanism for a vacuum milking-machine system, comprising a self-contained unit of pulsator and vacuum ducts adapted to be positioned on, and connected with, a vertically projecting extension of a milk-pail cover in communication with the inside of the pail, said unit comprising a socket in communication with said vacuum duct and adapted to position and support said unit on said pail-cover extension, said socket being provided with an internal annular groove and resilient sealing means located therein, so that, when the said unit is removed from said pail, said socket will retain said sealing means.

6. A pulsator unit having a socket adapted to be fitted over an extension projecting from a milk pail, said socket having a passage in the wall thereof, a tubular extension projecting from the wall of the socket having the passage therein, and a ball positioned for limited movement within the tubular extension and adapted to contact and seal the socket passage, said tubular extension constituting vacuum means adapted to communicate with the interior of the socket, and said ball constituting a valve for closing communication between the vacuum means and the socket.

HERBERT McCORNACK.